United States Patent [19]

Kawamura

[11] Patent Number: 4,945,350

[45] Date of Patent: Jul. 31, 1990

[54] LIQUID CRYSTAL DISPLAY UNIT

[75] Inventor: Yasukazu Kawamura, Kanagawa, Japan

[73] Assignee: Mitsubishi Denki Kabushiki Kaisha, Tokyo, Japan

[21] Appl. No.: 338,383

[22] Filed: Apr. 13, 1989

Related U.S. Application Data

[63] Continuation of Ser. No. 882,677, Jul. 7, 1986, abandoned.

[30] Foreign Application Priority Data

Jul. 9, 1985 [JP] Japan ................................ 60-150556
Jul. 9, 1985 [JP] Japan ................................ 60-150557

[51] Int. Cl.$^5$ ............................................. G09G 3/36
[52] U.S. Cl. ..................................... 340/784; 350/345
[58] Field of Search ................ 340/765, 784; 350/345, 350/334; 362/27, 31

[56] References Cited

U.S. PATENT DOCUMENTS

| | | |
|---|---|---|
| 4,487,481 | 12/1984 | Suzawa ................................ 340/784 |
| 4,549,174 | 10/1985 | Funada et al. ...................... 340/784 |
| 4,616,295 | 10/1986 | Jewell et al. ........................ 350/345 |

FOREIGN PATENT DOCUMENTS

| | | | |
|---|---|---|---|
| 2910779 | 9/1980 | Fed. Rep. of Germany ...... | 340/784 |
| 3116144 | 11/1982 | Fed. Rep. of Germany ...... | 340/784 |
| 0067296 | 6/1977 | Japan .................................. | 340/784 |
| 0036199 | 4/1978 | Japan .................................. | 340/784 |
| 0023745 | 2/1984 | Japan .................................. | 340/784 |

OTHER PUBLICATIONS

IBM Technical Disclosure Bulletin by W. A. Young, pp. 2435-2436, vol. 15, No. 8, Jan. 1973.
Oguchi et al., Nikkei Electronics, No. 351, pp. 211-240, Sep. 1984.

*Primary Examiner*—Jeffery A. Brier
*Attorney, Agent, or Firm*—Wolf, Greenfield & Sacks

[57] ABSTRACT

A liquid crystal display unit comprising a liquid crystal display panel and a light source for illuminating the display panel with uniform brightness sufficient for identifying characters and images in a dark or dim place. The light source may be a combination of at least one fluorescent lamp and a light-guiding member, a single meandering fluorescent lamp, or a single fluorescent lamp having a zigzag discharge path. Thermal-pressure-welding type flexible cables connect the display panel with an electric driving circuit therefor. A light source having more thickness than five millimeters is incorporated with the liquid crystal display unit.

12 Claims, 5 Drawing Sheets

LIQUID CRYSTAL DISPLAY UNIT

This application is a continuation, of application Ser. No. 06/882,677, filed July 7, 1986, now abandoned.

TECHNICAL FIELD

The present invention relates to a liquid crystal display unit used as display units for computers and office machines.

PRIOR ART

FIGS. 1 and 2 show one example of the liquid crystal display units of the prior art in which a reflection plate is used. In these figures, a well-known liquid crystal display panel 1 comprises a liquid crystal 2 enclosed by the side plates 3 and 4 and upper and lower transparent plates 5 and 6. The predetermined number of scanning electrodes 15 (FIG. 5) of transparent conductive thin strips are formed on one of the facing surfaces of upper and lower transparent plates 5 and 6, and the predetermined number of signaling electrodes 16 (FIG. 5) of transparent conductive thin strips are formed on the other of the facing surfaces so that these electrodes 15 and 16 are in a matrix shape.

Liquid crystal display panel 1 further includes a upper polarizing plate 7 formed on the upper surface of transparent plate 5 and a lower polarizing plate 8 formed on the lower surface of transparent plate 6. On the lower surface of polarizing plate 8, a reflecting plate 9 is provided for reflecting the light beam transmitting through liquid crystal display panel 1.

A substrate 10 carries a driving circuit which drives liquid crystal display panel 1. The circuit and display panel 1 are interconnected by cables 11 and 12.

FIGS. 3 and 4 show another example of the liquid crystal display units of the prior art using conductive elastic connectors. The display unit shown in these figures differs from the display unit shown in FIGS. 1 and 2 in that two conductive elastic connectors 13 and 14 are employed instead of cables 11 and 12 for interconnecting the driving circuit on substrate 10 and liquid crystal display panel 1.

The operation of these display panels shown in FIGS. 1–4 will be explained as follows. As shown in FIG. 5, scanning electrodes 15 and signaling electrodes 16 are provided such as to form a matrix shape inside of liquid crystal display panel 1. Voltage pulses are applied in sequence to scanning electrodes 15, while voltage signals are applied selectively to signaling electrodes 16.

Accordingly, twists occur in the liquid crystal molecules at intersecting points selected by the voltage pulses and the voltage signals in a time-division manner. On such a principle, the extraneous light, passing through upper polarizing plate 7, then transmits through or is intercepted by liquid crystal 2 in accordance with the state of the liquid crystal molecules at intersecting points of transparent electrodes 15 and 16. Thus, a unit display cells is formed at each of the intersecting points of electrodes 15 and 16 where the liquid crystal molecules transmit or intercept the extraneous light. Characters and/or images are displayed on the display surface constituted by these display cells.

In the liquid crystal display units of the prior art constructed as described above, the scanning voltages are applied in a time-sharing manner, so the scanning duty ratio, that is, the reciprocal of the number of the scanning electrodes, decreases as the number of the display cells increases. Accordingly, in liquid crystal display units having more size than 640×200 dots or display cells, the effective value of the voltage applied to the liquid crystal molecules decreases, resulting in a lowered contrast ratio and a deteriorated quality of displayed characters and images. Moreover, the quantity of light after impinging on liquid crystal display panel 1 is reduced because the light beam has to pass through the upper and lower polarizing plates. That causes the brightness of the whole display surface to be lowered.

In short, the liquid crystal display units of the prior art have difficulties in identifying characters and images at a dark or dim place, since identification of characters and images needs a sufficient quantity of light.

In order to overcome such disadvantages, it is conceivable to provide liquid crystal display units with a light source for backlight, instead of the reflecting plate, disposed at the rear of the liquid crystal display panel. As is the case with automobile display panels or instrument panels, one can employ an electroluminescent light emitting plate as a backlight source for a liquid crystal display panel instead of the reflecting plate. However, it has been found that the electroluminescent light emitting plates available at present are not suitable for display units for computers because of insufficient quantity of light emitted by those plates.

In addition, the following problems have been raised in case of interconnecting the liquid crystal display panel and the driving circuit by means of the conductive elastic connectors as described in FIGS. 3 and 4. When a backlight source is incorporated between the display panel and the substrate, if the height of the conductive elastic connectors is large, these connectors are transformed during the process of integration, and disconnection tends to occur. As a result, only planar light sources of less thickness than five millimeters are usable for the backlight source. Thus, it is impossible to provide liquid crystal display units with a light source having a life span and brightness suitable for display units for computers and office machines.

SUMMARY OF THE INVENTION

The present invention is intended to solve the difficulties or disadvantages as described above.

One object of the invention is to provide a liquid crystal display unit having a high quality of display sufficient for identifying characters and/or images at a dark or dim place by incorporating a backlight source with a liquid crystal display panel to heighten the brightness of a liquid crystal display surface.

In order to achieve this object, a liquid crystal display unit according to the present invention includes, as a backlight source, a planar light source comprising the combination of at least one fluorescent lamp and a light-guiding member. The light source is disposed between a liquid crystal display panel and a substrate carrying a driving circuit for the display panel, so as to illuminate the liquid crystal display panel uniformly. Preferably, the fluorescent lamp is of a cold-cathode type which has a life span more than 20,000 hours and which does not generate much heat. A liquid crystal display unit employing such cold-cathode fluorescent lamps as a light source is suitable for a display for computers and office machines.

In one aspect of the invention, one cold-cathode fluorescent lamp is provided in each of the grooves formed in the side surfaces of the light-guiding member. However, instead of the combination of the fluorescent lamps and the light-guiding member, it is possible to use as a backlight source a single meandering fluorescent lamp or a single fluorescent lamp having a zigzag discharge path.

The liquid crystal display unit as described above keeps a high quality of display irrespective of a place and a quantity of light by incorporating the backlight source emitting a sufficient quantity of light, compared with the liquid crystal display units of the prior art in which the brightness of the display surface and the visibility of characters and images are dependent on a quantity of the light incident upon the display surface.

Another object of the invention is to provide a liquid crystal display unit capable of incorporating a backlight source having an arbitrary thickness, for example, more thickness than five millimeters, by using flexible cables.

In order to achieve this object, a planar backlight source is disposed between a liquid crystal display panel and a substrate carrying a driving circuit, and flexible cables are used to interconnect the display panel and the driving circuit. Preferably, the flexible cables are of a thermal-pressure-welding type, and the planar backlight source comprises two fluorescent lamps and a light-guiding member disposed between the fluorescent lamps. It is clear that a single meandering fluorescent lamp or a single fluorescent lamp having a zigzag discharge path can also be used as a backlight source.

The liquid crystal display unit as described above is characterized by the flexible cables which interconnect the display panel and the driving circuit. The length of the flexible cables is arbitrarily selectable, so the display unit is capable of incorporating the backlight source more thickness than five millimeters including the fluorescent lamps. Moreover, the liquid crystal display unit according to the present invention may be constructed with a large display panel. Thus, it is possible to obtain a bright, long-lived display surface suitable for display units for computers and office machines.

BRIEF DESCRIPTION OF THE DRAWINGS

Further objects and advantages of the present invention will be apparent from the following description, reference being had to the accompanying drawings wherein preferred embodiments of the present invention are clearly shown.

PREFERRED EMBODIMENTS OF THE INVENTION

Reference is now made more particularly to FIGS. 6-12 which illustrate the best mode of carrying out the invention.

Figure 6:
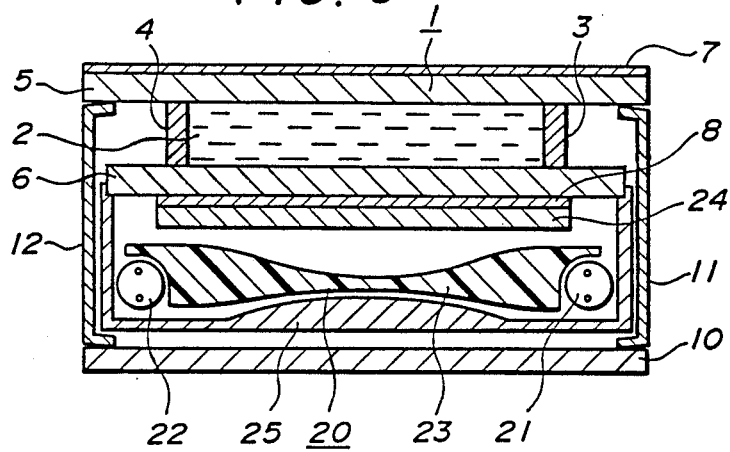
FIG. 6 is a sectional view of an embodiment of the liquid crystal display units according to the present invention.
Figure 7:
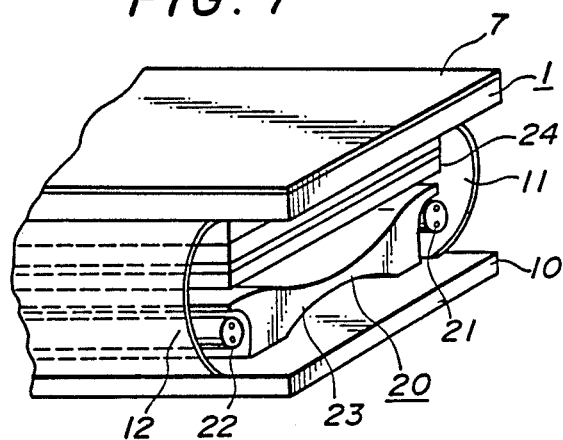
FIG. 7 illustrates a portion of the display unit shown in FIG. 6, a casing being excluded for clarity.

In FIGS. 6 and 7 showing one embodiment of the present invention, the reference numerals 1-8, 10, 11 and 12 designate like parts in the prior art. The reference numeral 20 designates a planar backlight source which comprises two cold-cathode fluorescent lamps 21 and 22 and a light-guiding plate 23. One cold-cathode fluorescent lamp 21 is disposed in a groove formed in one side wall of light-guiding member 23, and the other cold-cathode fluorescent lamp 22 is disposed in a groove formed in the other side wall of light-guiding member 23. Light-guiding plate 23 is monobloc-molded out of acrylic resin and has a concave portion on each of the upper and lower surfaces in order to enhance uniformity of the brightness.

Backlight source 20 is positioned between substrate 10 and a light-diffusing plate 24 provided on the rear surface of lower polarizing plate 8. Light-diffusing plate 24 is formed such that one or both of the upper and lower surfaces of plate 24 are rugged in order to diffuse the light from light-guiding plate 23. The light beam emitted by fluorescent lamps 21 and 22 illuminates light-diffusing plate 24 uniformly by the light-guiding function of guiding member 23. In short, backlight source 20 provides for a planar light source for illuminating liquid crystal display panel 1 with uniform brightness. Light-guiding plate 23 and cold-cathode fluorescent lamps 21 and 22 are supported by a casing 25 made out of white plastic. Casing 25 operates as a reflecting plate in order to utilize the light from fluorescent lamps 21 and 22 as efficiently as possible.

Figure 1:
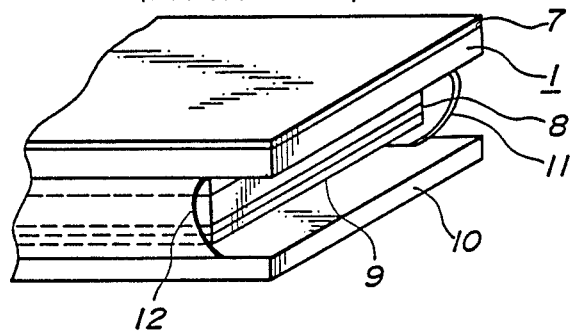
FIG. 1 illustrates a portion of an example of the liquid crystal display units of the prior art.
Figure 2:
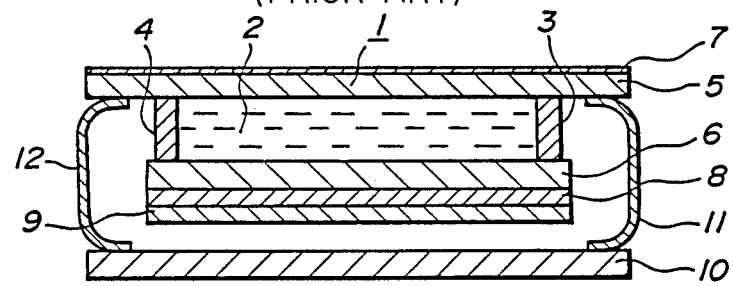
FIG. 2 is a sectional view of the display unit shown in FIG. 1.
Figure 3:
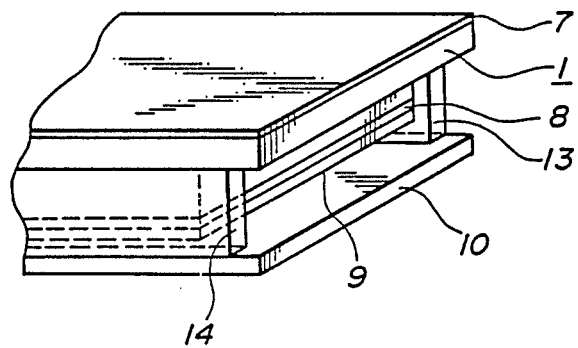
FIG. 3 illustrates a portion of another example of the liquid crystal display units of the prior art.
Figure 4:
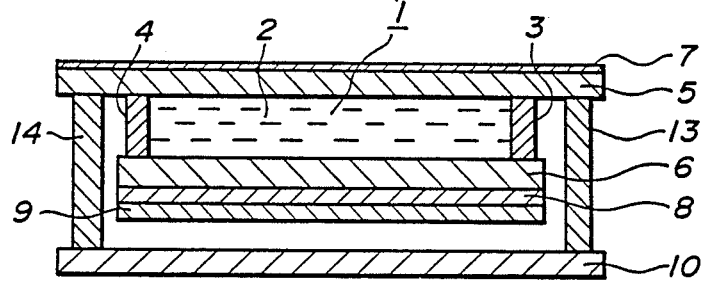
FIG. 4 is a sectional view of the display unit shown in FIG. 3.
Figure 5:
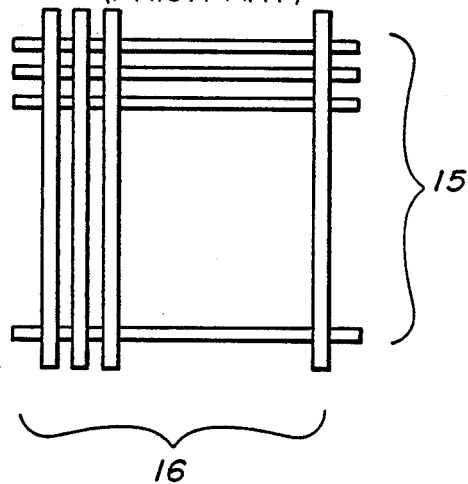
FIG. 5 shows a structure of the scanning electrodes and the signaling electrodes in the liquid crystal display panels.

The operation of this embodiment for displaying characters and/or images is similar to that of the prior art display units shown in FIGS. 1-4. Also in this embodiment, the scanning electrodes and the signaling electrodes are formed, as shown in FIG. 5, with thin transparent conductive strips in a matrix shape, and are operable to change the disposition of the liquid crystal molecules in accordance with the presence or absence of the voltage applied to the intersecting points selected in a time-division manner.

Due to the combined operation of liquid crystal 2 and upper and lower polarizing plates 7 and 8, the light beam emitted by backlight source 20 and incident upon liquid display panel 1 transmits through or is intercepted by display panel 1, and characters and/or images are displayed on the display surface. The brightness of backlight source 20 can be set arbitrarily by changing the applied voltage, enabling to obtain the highest level of display quality irrespective of quantity of the light incident on display panel 1 from the outside.

As explained above, the fact that the backlight source comprising the cold-cathode fluorescent lamps and the light-guiding member is incorporated with the liquid crystal display unit, enables to obtain a display quality sufficient for identifying characters and images in a dark or dim place even in case of a large-sized display panel such as one having a size of 640×210 dots. Use of the cold-cathode fluorescent lamps lengthens the life span of the liquid crystal display unit and saves the trouble of making an exchange as long as the liquid crystal lives. Moreover, the cold-cathode fluorescent lamps do not generate much heat nor exert a bad influence to the liquid crystal.

Figure 8:
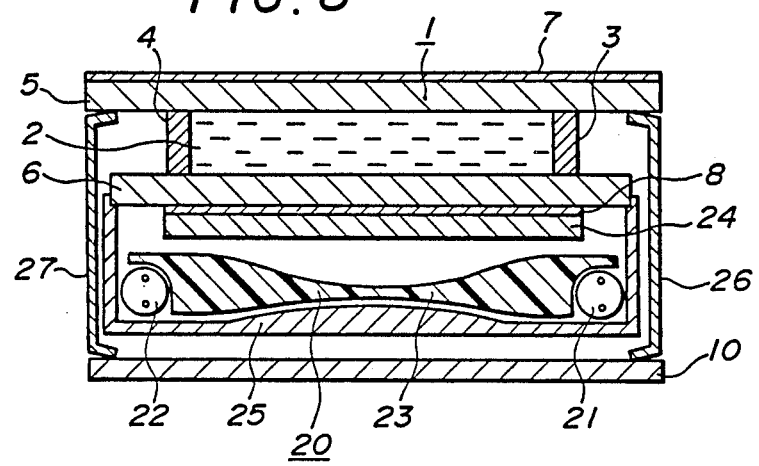
FIG. 8 is a sectional view of another embodiment of the liquid crystal display units according to the present invention.

In case of integrating a backlight source constructed as explained above and having more thickness than five millimeters, flexible cables, for example, those of a thermal-pressure-welding type, can be used because the length of such cables can be set arbitrarily. FIG. 8 shows another embodiment of the liquid crystal display units according to the present invention in which flexible cables 26 and 27 of a thermal-pressure-welding type are employed to interconnect liquid crystal display panel 1 and substrate 10 carrying the driving circuit for display panel 1. In this figure, reference numerals 1–8, 10 and 20–25 respectively designate like parts shown in FIGS. 1–7.

By using such thermal-pressure-welding type flexible cables 26 and 27 which length can be set arbitrarily, it is possible to provide the liquid crystal display unit with backlight source 20 having more thickness than five millimeters and comprising cold-cathode fluorescent lamps 21 and 22 and light-guiding member 23, and to provide a liquid crystal display unit free of disconnection and having a sufficient display quality for identifying characters and/or images in a dark or dim place.

Hereafter, explanations will be made on matters common to both embodiments as described above.

Figure 9:
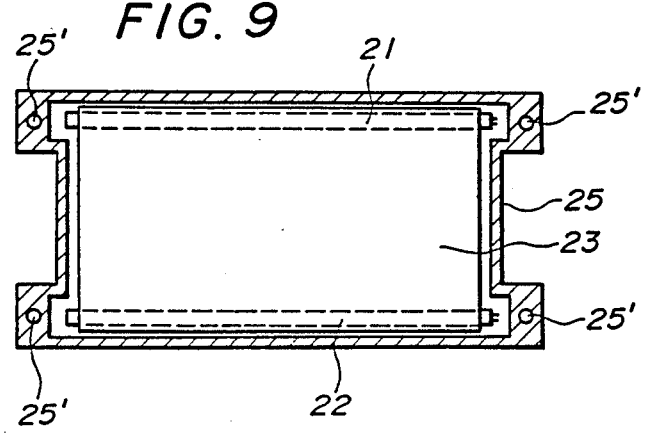
FIG. 9 is a plan view of a planar backlight source contained in a casing used in both embodiments shown in FIGS. 6, 7 and 8.

FIG. 9 shows a plan view of planar backlight source 20 contained in casing 25. Two fluorescent lamps 21 and 22 and light-guiding plate 23 are supported and held within casing 25. As light-guiding plate 23 is constructed such as to be taken out of casing 25, fluorescent lamps can be exchanged by removing light-guiding plate 23.

Figure 10:
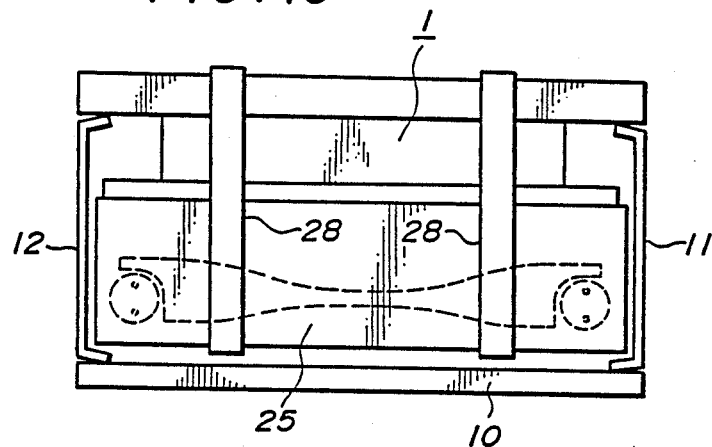
FIG. 10 is a front view of the liquid crystal display panel of the present invention.
Figure 11:
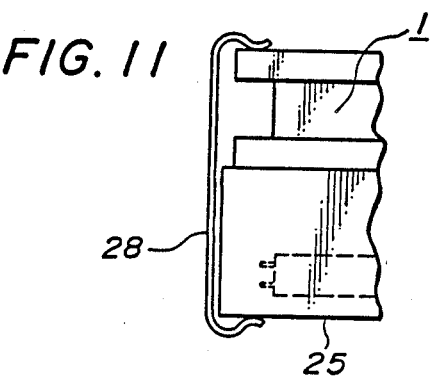
FIG. 11 is a side view of a portion of the integrated casing and display panel of the liquid crystal display unit of the present invention.

As shown in FIGS. 10 and 11, casing 25 which contains planar backlight source 20 is fastened with liquid crystal display panel 1 by a plurality of holders 28. The casing 25 and display panel 1 thus fastened together are incorporated with the display unit by means of mounting holes 25' (FIG. 9). When one or two fluorescent lamps are to be exchanged, firstly, display panel 1 and casing 25 are taken out of the unit, secondly, planar backlight source is removed by detaching holders 28, and thirdly, light-guiding plate 23 is taken off from casing 25.

Figure 12:
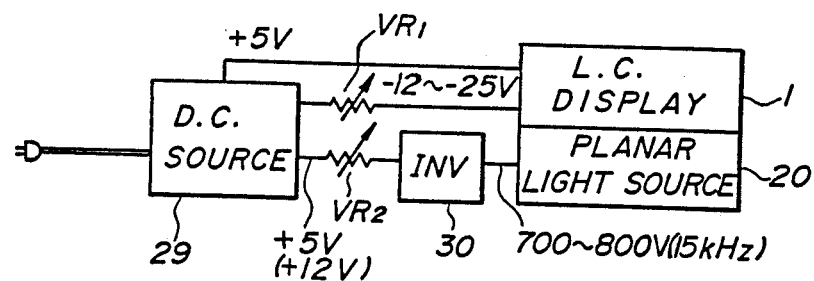
FIG. 12 illustrates an electrical connection between the D.C. source and the liquid crystal display unit of the present invention.

Referring to FIG. 12, liquid crystal display panel 1 and planar backlight source 20 are power-supplied by D.C. source 29. Display panel 1 receives a positive voltage directly and a variable negative voltage through variable resister $VR_1$ from D.C. source 29. For example, the value of the positive voltage is +5 V, and the negative voltage varies from −25 V to −12 V by adjusting variable resister $VR_1$ which serves to control the contrast of the liquid crystal display panel. Planar backlight source 20 receives an A.C. voltage from inverter 30. The value of the A.C. voltage is set, for example, between 700 V and 800 V at 15 KHz. The input terminal of inverter 30 is connected through variable resister $VR_2$ to an output terminal of D.C. source 29 which supplies a positive voltage (for example, +5 V or +12 V). Variable resister $VR_2$ serves to control the brightness of backlight source 20.

Figure 13A:
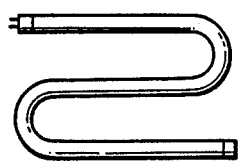
FIGS. 13a, 13b and 13c illustrate examples of fluorescent lamps used for a planar backlight source in the liquid crystal display unit of the present invention.
Figure 13B:
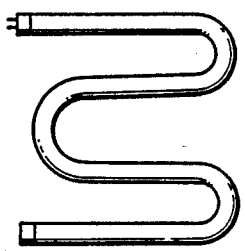
Figure 13C:
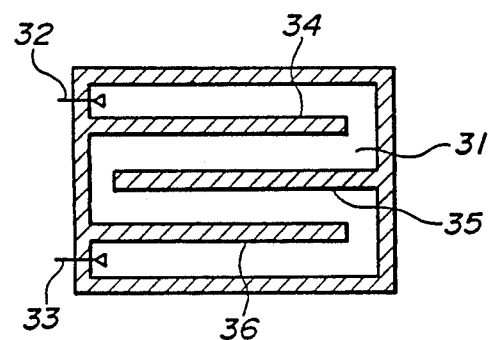

In both embodiments as shown in FIGS. 6, 7 and 8, the display unit employs planar backlight source 20 comprising fluorescent lamps 21 and 22 and light-guiding plate 23, as shown in FIG. 9, for illuminating display panel 1 with uniform brightness. Instead of such a planar backlight source, it is possible to use various kinds of planar light sources capable of illuminating the display panel uniformly. FIGS. 13a, 13b and 13c show some examples of such planar light sources. In FIGS. 13a and 13b, a fluorescent lamp is formed to have a meandering shape. FIG. 13c depicts a fluorescent lamp having a zigzag discharge path 31 formed between the electrodes 32 and 33 by partitioning the hermetically sealed space in a zigzag shape by a plurality of partition walls 34, 35 and 36.

While the preferred forms of the present invention have been described, it is to be understood that modifications will be apparent to those skilled in the art without departing from the spirit of the invention, and that the scope of the invention is to be determined solely by the following claims.

What is claimed is:

1. A liquid crystal display unit for displaying characters and/or images comprising:
   a liquid crystal display panel including a liquid crystal interposed between first and second transparent plates, a first polarizing plate disposed on the upper surface of said first transparent plate, and a second polarizing plate disposed on the rear surface of said second transparent plate;
   a substrate carrying an electric circuit for driving said liquid crystal display panel;
   means for interconnecting said electric circuit and said liquid crystal display panel;
   a planar light source disposed between said liquid crystal display panel and said substrate and comprising two linear fluorescent lamps and a light guiding member, said light guiding member comprising a light guiding plate extending substantially in parallel with said liquid crystal display panel and disposed substantially in a first plane, said linear fluorescent lamps being disposed at opposite side surfaces of said light guiding plate and extending substantially in parallel to each other and disposed in said first plane, said light guiding plate including means for controlling light coupling so as to direct light substantially orthogonal to said first plane direction and toward said liquid crystal display panel;
   said light guiding plate having opposite upper and lower surfaces, said upper surface facing said liquid crystal display panel, said means for controlling light coupling from the light guiding plate comprising a concave surface portion on each of the upper and lower surfaces of said light guiding plate to enhance uniformity of brightness;
   a casing for containing said fluorescent lamps and light guiding member and including a reflecting plate for efficiently and uniformly utilizing the light from the fluorescent lamps;
   said casing reflecting plate extending under said light guiding plate and having a convex surface portion disposed adjacent to and in symmetric alignment with the concave surface portion of said lower surface of said means for controlling light coupling, and end walls disposed closely adjacent respective linear fluorescent lamps for reflecting light therefrom;

wherein said casing member and said planar light source contained therein are disposed between said liquid crystal display panel and said substrate and are detachably mounted to the rear surface of said liquid crystal display panel, thereby said planar light source illuminates said liquid crystal display panel with uniform intensity from behind.

2. A display unit according to claim 1, further comprising holders for detachably fastening said casing to said liquid crystal display panel.

3. A display unit according to claim 1, wherein a light diffusing plate is provided between said liquid crystal display panel and said planar light source.

4. A display unit according to claim 3, wherein said fluorescent lamps are of a cold-cathode type.

5. A display unit according to claim 1, wherein said light guiding member has opposite disposed side grooves for receiving therein at least a part of the respective fluorescent lamps.

6. A display unit according to claim 5, wherein said grooves in said light guiding member are each defined by a flange that covers a substantial portion of the associated fluorescent lamps.

7. A display unit according to claim 6, wherein said end walls, said light guiding plate, and said flange define a lamp accommodating compartment larger than the lamp but substantially smaller than the distance between lamps.

8. A display unit according to claim 1, wherein the thickness of the light guiding plate is varied to have a thinner segment at a position remote from both lamps so as to equalize all light transmission paths through said light guiding plate.

9. A display unit according to claim 1 wherein the liquid crystal display panel has a centrally disposed axis and the concave surface portions likewise have a central axis in alignment with the axis of said liquid crystal display panel.

10. A display unit according to claim 9 wherein said casing reflecting plate convex surface portion likewise has a central axis in alignment with the axis of said concave surface portions of said light guiding plate.

11. A display unit according to claim 10 wherein the radius of curvature of said concave surface portion is substantially the same as the radius of curvature of said convex surface portion.

12. A display unit according to claim 11 wherein said casing convex surface portion is accommodated within the lower concave surface portion of said light guiding plate.

* * * * *